United States Patent
Park

(10) Patent No.: US 9,593,659 B2
(45) Date of Patent: Mar. 14, 2017

(54) METHOD AND SYSTEM FOR CONTROLLING WARM-UP OF CLUTCH FLUID IN HYBRID ELECTRICAL VEHICLE

(71) Applicants: Hyundai Motor Company, Seoul (KR); Kia Motors Corporation, Seoul (KR)

(72) Inventor: Tae Wook Park, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 932 days.

(21) Appl. No.: 13/927,530

(22) Filed: Jun. 26, 2013

(65) Prior Publication Data

US 2014/0129119 A1    May 8, 2014

(30) Foreign Application Priority Data

Nov. 8, 2012    (KR) .................... 10-2012-0126235

(51) Int. Cl.
*F02N 19/00* (2010.01)
*F16D 25/12* (2006.01)
(Continued)

(52) U.S. Cl.
CPC ............. *F02N 19/00* (2013.01); *B60K 6/48* (2013.01); *B60W 10/08* (2013.01); *B60W 20/00* (2013.01);
(Continued)

(58) Field of Classification Search
CPC .......... F02D 28/00; F02N 11/04; F02N 19/00; F02N 2200/022; F02N 2200/061;
(Continued)

(56) References Cited

U.S. PATENT DOCUMENTS 6,565,473 B2 * 5/2003 Endo ................. B60K 6/48
475/117
7,832,206 B2 * 11/2010 Morgan, Jr. ........... F16H 59/72
60/329
(Continued)

FOREIGN PATENT DOCUMENTS

JP    2012091613 A    5/2012
JP    2012-121549 A    6/2012
(Continued)

*Primary Examiner* — Hieu T Vo
*Assistant Examiner* — Arnold Castro
(74) *Attorney, Agent, or Firm* — Mintz Levin Cohn Ferris Glovsky and Popeo, P.C.; Peter F. Corless

(57) ABSTRACT

A system and a method that control warm-up of clutch fluid in a hybrid electric vehicle. The hybrid electric vehicle includes a clutch that controls power delivery between an engine and a motor and an oil pump that is operated by the motor and generates hydraulic oil pressure operating the clutch. The method includes determining, by a controller, whether delivery of power from the engine and motor in a transmission is cut and detecting temperature of the fluid using an oil temperature detector. In addition, the motor is maintained by the controller at a predetermined target speed to operate the oil pump connected to the motor when the detected temperature of the fluid is equal to or less than a predetermined temperature, wherein the predetermined target speed is a motor speed at which sufficient pressure for flowing the fluid is generated in the oil pump operating with the motor.

17 Claims, 5 Drawing Sheets

(51) Int. Cl.
  *B60K 6/48* (2007.10)
  *B60W 10/08* (2006.01)
  *B60W 20/00* (2016.01)
  *B60W 30/00* (2006.01)
  *F02N 11/04* (2006.01)

(52) U.S. Cl.
  CPC ............ *F16D 25/12* (2013.01); *B60W 30/00* (2013.01); *B60W 2510/06* (2013.01); *B60W 2510/0638* (2013.01); *B60W 2510/0642* (2013.01); *B60W 2510/0666* (2013.01); *B60W 2510/085* (2013.01); *B60W 2510/101* (2013.01); *B60W 2510/107* (2013.01); *B60W 2510/244* (2013.01); *B60W 2710/081* (2013.01); *B60W 2710/1072* (2013.01); *F02N 11/04* (2013.01); *F02N 2200/022* (2013.01); *F02N 2200/061* (2013.01); *F02N 2200/0802* (2013.01); *Y02T 10/6221* (2013.01)

(58) Field of Classification Search
  CPC .......... F02N 2200/0802; B60W 10/08; B60W 20/00; B60W 30/00; B60W 2510/06; B60W 2510/085; B60W 2510/101; B60W 2510/107; B60W 2510/244; B60W 2510/0638; B60W 2510/0642; B60W 2510/0666; B60W 2710/081; B60W 2710/1072; B60K 6/48; F16D 25/12; Y02T 10/6221

See application file for complete search history.

(56) References Cited

U.S. PATENT DOCUMENTS

| | | | |
|---|---|---|---|
| 8,229,637 B2* | 7/2012 | Kobayashi | F16H 59/72 701/51 |
| 8,852,045 B2* | 10/2014 | Kang | F16H 61/0031 475/117 |
| 2012/0083978 A1* | 4/2012 | Tajima | F16H 61/0213 701/55 |
| 2012/0108385 A1* | 5/2012 | Sano | B60K 6/48 477/5 |
| 2013/0149170 A1* | 6/2013 | Song | F16H 61/0025 417/32 |
| 2013/0151131 A1* | 6/2013 | Laszlo | F02D 28/00 701/113 |

FOREIGN PATENT DOCUMENTS

| | | |
|---|---|---|
| KR | 10-0887812 | 3/2009 |
| KR | 10-2010-0104603 A | 9/2010 |

\* cited by examiner

METHOD AND SYSTEM FOR CONTROLLING WARM-UP OF CLUTCH FLUID IN HYBRID ELECTRICAL VEHICLE

CROSS-REFERENCE TO RELATED APPLICATION

This application claims priority to and the benefit of Korean Patent Application No. 10-2012-0126235 filed in the Korean Intellectual Property Office on Nov. 8, 2012, the entire contents of which are incorporated herein by reference.

BACKGROUND OF THE INVENTION (a) Field of the Invention

The present invention relates to a system and a method that controls warm-up of clutch fluid in a hybrid electric vehicle configured to rapidly raise temperature of clutch fluid that operates a clutch by controlling a motor while the hybrid electric vehicle is being warmed up.

(b) Description of the Related Art

Hybrid electric vehicles operate through the use of power from an internal combustion engine and power from a battery. In particular, hybrid electric vehicles are designed to efficiently combine and use power of the internal combustion engine and the motor. For example, as illustrated in FIG. 1, a hybrid electric vehicle includes: an engine 10, a motor 20, a clutch 30, a transmission 40, a differential gear unit 50, a battery 60, an integrated starter-generator (ISG) 70, and wheels 80. The clutch 30 controls power transmission between the engine 10 and the motor 20, and the ISG 70 starts the engine 10 or generates electric power by output of the engine 10.

As further shown, the hybrid electric vehicle includes: a hybrid control unit (HCU) 200 that controls the overall operation of the hybrid electric vehicle; an engine control unit (ECU) 110 that controls operation of the engine 10; a motor control unit (MCU) 120 that controls operation of the motor 20; a transmission control unit (TCU) 140 that controls operation of the transmission 40; and a battery control unit (BCU) 160 that manages and controls the battery 60.

The battery control unit 160 may also be referred to as a battery management system (BMS). In the vehicle industry, the integrated starter-generator 70 may also be referred to as a starting/generating motor or a hybrid starter & generator.

The hybrid electric vehicle may run in a driving mode, such as an electric vehicle (EV) mode using only power of the motor 20, a hybrid electric vehicle (HEV) mode using torque of the engine 10 as main power and torque of the motor 20 as auxiliary power, and a regenerative braking (RB) mode during braking or when the vehicle runs by inertia. In the RB mode, braking and inertia energy are collected through power generation of the motor 20, and the battery 60 is charged with the collected energy.

As described above, the hybrid electric vehicle uses both mechanical energy of the engine and electrical energy of a battery, uses optimal operation regions of the engine and the motor, and recovers the energy of the motor during braking, thereby increasing fuel and energy efficiency.

In the hybrid electric vehicle as described above, the clutch 30 is disposed between the engine 10 and the motor 20 instead of a torque convertor to reduce cost and to decrease torque loss. The clutch 30 is generally operated by fluid. Impacts due to engagement of the clutch 30 may affect drivability. The fluid that operates the clutch 30 is generally oil in the transmission 40. The oil filled in the transmission 40 also operates as hydraulic oil to operate the clutch 30 which is disposed within the transmission 40. In other words, the oil operates both the clutch 30 and a transmission clutch.

As illustrated in FIG. 1, the fluid flows according to the operation of an oil pump 80. The oil pump 80 is connected with the motor 20 and is operated by the motor 20. Temperature of the fluid may be detected by an oil temperature sensor 90. Since viscosity of the fluid varies based on temperature, control performance on the clutch 30 may depend on the temperature of the fluid. In particular, when ambient temperature of the fluid drops below −20 degrees Celsius, the viscosity of the fluid is significantly increased, thus causing difficulty in precise control of the clutch 30. When precise control on the clutch 30 is difficult, a substantially large shock occurs during clutch engagement, which results in deterioration of drivability.

In an exemplary embodiment of the conventional art, a control method in which the clutch slips causes the temperature of the clutch fluid to rise by frictional heat generated by the clutch slip. However, with the control method of the conventional art in which the clutch slip is used to raise the temperature of the clutch fluid, a few drawbacks associated with the clutch slip may occur.

For example, when the clutch is slipped, vibration noises may occur. In addition, since the control method of the conventional art uses the clutch slip under a substantially low temperature, durability and performance of the clutch and fuel efficiency may be deteriorated.

The above information disclosed in this Background section is only for enhancement of understanding of the background of the invention and therefore it may contain information that does not form the prior art that is already known in this country to a person of ordinary skill in the art.

SUMMARY

The present invention provides a system and a method that control warm-up of clutch fluid in a hybrid electric vehicle configured to rapidly raise temperature of the clutch fluid to a predetermined temperature by operating a motor and an oil pump operated with the motor while the hybrid electric vehicle is being warmed up.

Further, the present invention provides a system and a method that control warm-up of clutch fluid in a hybrid electric vehicle, which may not affect durability of the clutch and may increase drivability and fuel efficiency. An exemplary embodiment of the present invention provides a method of controlling warm-up of fluid in a hybrid electric vehicle which may include: a clutch configured to control power delivery between an engine and a motor, and an oil pump configured to be operated by the motor and to generate hydraulic oil pressure that operates the clutch, the method may include: determining whether delivery of power from the engine and motor in a transmission is cut; detecting temperature of the fluid using an oil temperature detector; and maintaining the motor at a predetermined target speed to operate the oil pump connected to the motor when the detected temperature of the fluid is equal to or less than a predetermined temperature, wherein the predetermined target speed is a motor speed at which sufficient pressure for flowing the fluid is generated in the oil pump operating with the motor.

In the exemplary embodiment of the present invention, the predetermined target speed may be a motor speed at which a pressure greater than a predetermined pressure is generated in the oil pump operating with the motor. In addition, the maintaining of the motor at a targeted speed may be performed when the engine is in an idle state. The transmission may be an automatic transmission, and the determining of whether delivery of power from the engine and motor in a transmission is cut may include determining that the delivery of power from the engine and motor in the transmission is cut when the transmission is in a neutral position (N range) or a parked position (P range).

Moreover, the controlling of the motor may include operating an integrated starter-generator and charging a battery with power generated by the integrated starter-generator when a SOC (state of charge) of the battery is equal to or lower than a predetermined SOC.

In the exemplary embodiment of the present invention, the method may further include stopping operation of the motor when the temperature of the fluid increases beyond a predetermined temperature. In addition, the method may further include: stopping operation of the motor when the transmission is in a drive position (D range) or a reverse position (R range).

In the exemplary embodiment of the present invention, the method may further include stopping operation of the integrated starter-generator when the operation of the motor is stopped.

Another exemplary embodiment of the present invention provides a system that controls warm-up of fluid in a hybrid electric vehicle, the system may include: a clutch configured to control power delivery between an engine and a motor; an oil pump configured to be operated with the motor and to generate flowing pressure operating the clutch; an oil temperature detector configured to detect temperature of the fluid; an integrated starter-generator configured to start the engine or to generate electric power by output of the engine; and a controller configured to maintain the motor in a predetermined condition to warm up the fluid, wherein the controller may be operated by a predetermined program, and the predetermined program may include a series of commands that execute the method of controlling the warm-up of the fluid in the hybrid electric vehicle.

As described above, an exemplary embodiment of the present invention may provide an advantage of rapidly increasing a temperature of clutch fluid to a predetermined temperature by operating a motor and an oil pump operated with the motor.

Further, an exemplary embodiment of the present invention may provide an advantage of increasing drivability and fuel efficiency without affecting durability of the clutch under a substantially low temperature, for example, in a −20 degrees Celsius environment.

DETAILED DESCRIPTION

Figure 1:
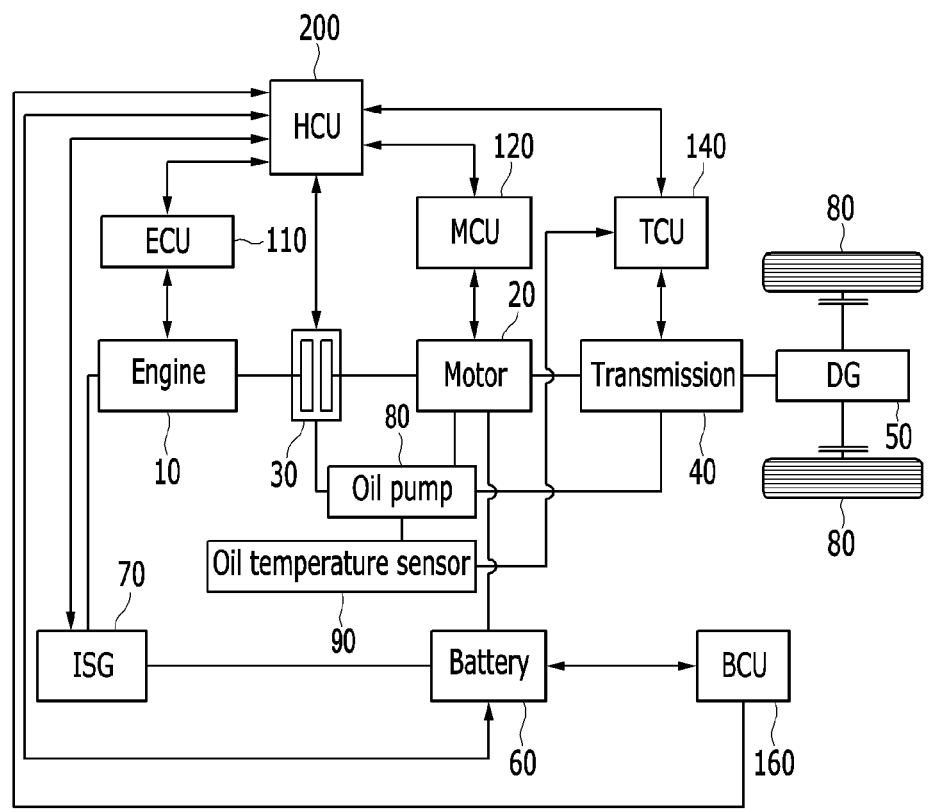
FIG. 1 is an exemplary block diagram typically illustrating a configuration of a hybrid electric vehicle according to a related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully with reference to the accompanying drawings, in which exemplary embodiments of the invention are shown. As those skilled in the art would realize, the described embodiments may be modified in various different ways, all without departing from the spirit or scope of the present invention. Further, throughout this specification, like reference numerals refer to like elements.

In the specification, unless explicitly described to the contrary, the word "comprise" and variations such as "comprises" or "comprising" will be understand to imply the inclusion of stated elements but not the exclusion of any other elements.

FIG. 1 is an exemplary diagram schematically illustrating a hybrid electric vehicle to which a clutch fluid warm-up control system of a hybrid electric vehicle according to an exemplary embodiment of the present invention is applied.

As shown in FIG. 1, a hybrid electric vehicle to which a clutch fluid warm-up control system of a hybrid electric vehicle according to an exemplary embodiment of the present invention may be applied includes an engine 10; a motor 20; a clutch 30 that controls power delivery between the engine 10 and the motor 20; a transmission 40; a differential gear unit 50; a battery 60; an integrated starter-generator (ISG) 70 that starts the engine 10 or generates electric power by output of the engine 10; and wheels 80.

As further shown, the hybrid electric vehicle may include a hybrid control unit (HCU) 200 that controls an overall operation of the hybrid electric vehicle; an engine control unit (ECU) 110 that controls an operation of the engine 10; a motor control unit (MCU) 120 that controls an operation of the motor 20; a transmission control unit (TCU) 140 that controls an operation of the transmission 40; and a battery control unit (BCU) 160 that manages and controls the battery 60.

In addition, the hybrid electric vehicle may include an oil pump 80 configured to be operated with the motor 20 and to generate flowing pressure that operates the clutch 30, and an oil temperature sensor 90 configured to sense or detect temperature of the fluid The oil pump 80 may be a mechanical oil pump connected with the motor 20 and may be operated by power of the motor 20.

Figure 2:
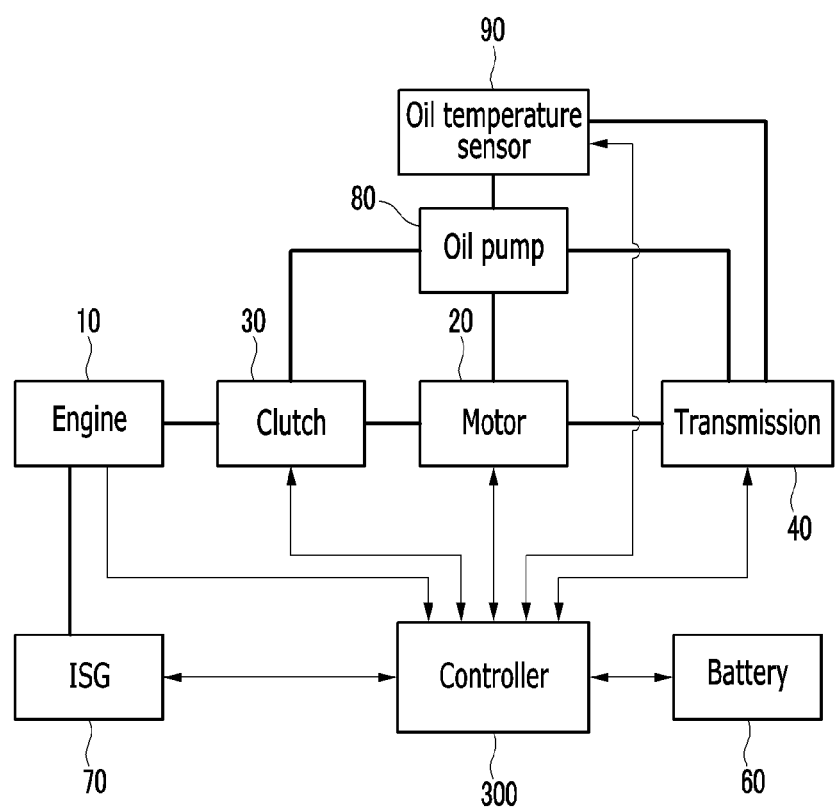
FIG. 2 is an exemplary block diagram illustrating a system that controls warm-up of clutch fluid in a hybrid electric vehicle according to an exemplary embodiment of the present invention.

FIG. 2 is an exemplary block diagram illustrating a system that controls warm-up of clutch fluid in the hybrid electric vehicle according to an exemplary embodiment of the present invention. The clutch fluid warm-up control system is a system configured to increase the temperature of the clutch fluid by operating the motor 20 in a state of the clutch 30 being disconnected.

The clutch fluid warm-up control system may include the clutch 30 configured to control power delivery between the engine 10 and the motor 20; the oil pump 80 configured to be operated with the motor 20 and to generate flowing pressure that operates the clutch 30; the oil temperature sensor 90 configured to sense or detect temperature of the fluid; the integrated starter-generator 70 configured to start the engine 10 or to generate electric power by output of the engine 10; and a controller 300 configured to maintain the motor in a predetermined condition to warm up the fluid.

Figure 3:
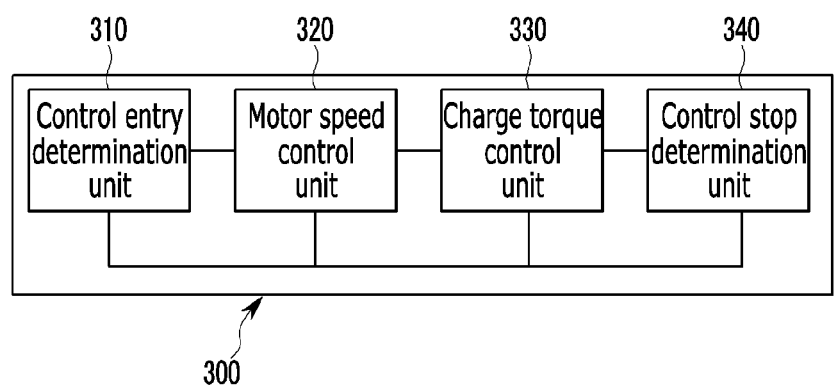
FIG. 3 is an exemplary detailed block diagram illustrating a controller in FIG. 2 according to an exemplary embodiment of the present invention.

As shown in FIG. 3, the controller 300 may include a plurality of units executed by the controller. The plurality of units may include a control entry determination unit 310 configured to determine whether a predetermined warm-up condition of the clutch fluid is satisfied, and when satisfied, to start the warm-up control of the clutch fluid; a motor speed control unit 320 configured to control the motor 20 while the warm-up control of the clutch fluid is performed; a charge torque control unit 330 configured to control torque of the integrated starter-generator 70 to charge the battery 60 with power generated by the integrated starter-generator 70 according to a SOC (state of charge) of the battery 60, while the motor 20 is controlled; and a control stop determination unit 340 configured to determine whether a predetermined stop condition of the warm-up control of the clutch fluid is satisfied, and when satisfied, to stop operation of the motor 20.

The controller 300 and/or each unit 310, 320, 330, and 340 in FIG. 3 may include a combination of program instructions and hardware. For example, the controller 300 and/or each unit 310, 320, 330, and 340 in FIG. 3 may be a PCB (printed circuit board) on which one or more microprocessors, ICs (integrated computers), various electronic components, and a memory that stores a predetermined program may be mounted, wherein the predetermined program may include a series of commands that execute a warm-up control method according to an exemplary embodiment of the present invention to be described below.

In the exemplary embodiment of the present invention, the oil pump 80 may be a mechanical oil pump connected with a shaft of the motor 20 and may be operated by torque of the motor 20, but it should be understood that the scope of the present invention is not limited thereto. Even with a different configuration of the oil pump, the technical spirit of the present invention may be applied to the configuration when the configuration is capable of generating pressure which is able to flow fluid by being passively operated by torque of the motor 20.

In the exemplary embodiment of the present invention, the oil temperature sensor 90 may be formed as a sensor that senses or detects oil temperature of the transmission 40 corresponding to fluid operating the clutch 30, but it should be understood that the scope of the present invention is not essentially limited thereto. Even when a configuration is different from the oil temperature sensor, the technical spirit of the present invention may be applied to the configuration when the configuration is capable of sensing or detecting the temperature of the oil (fluid) of the transmission 40.

Figure 4:
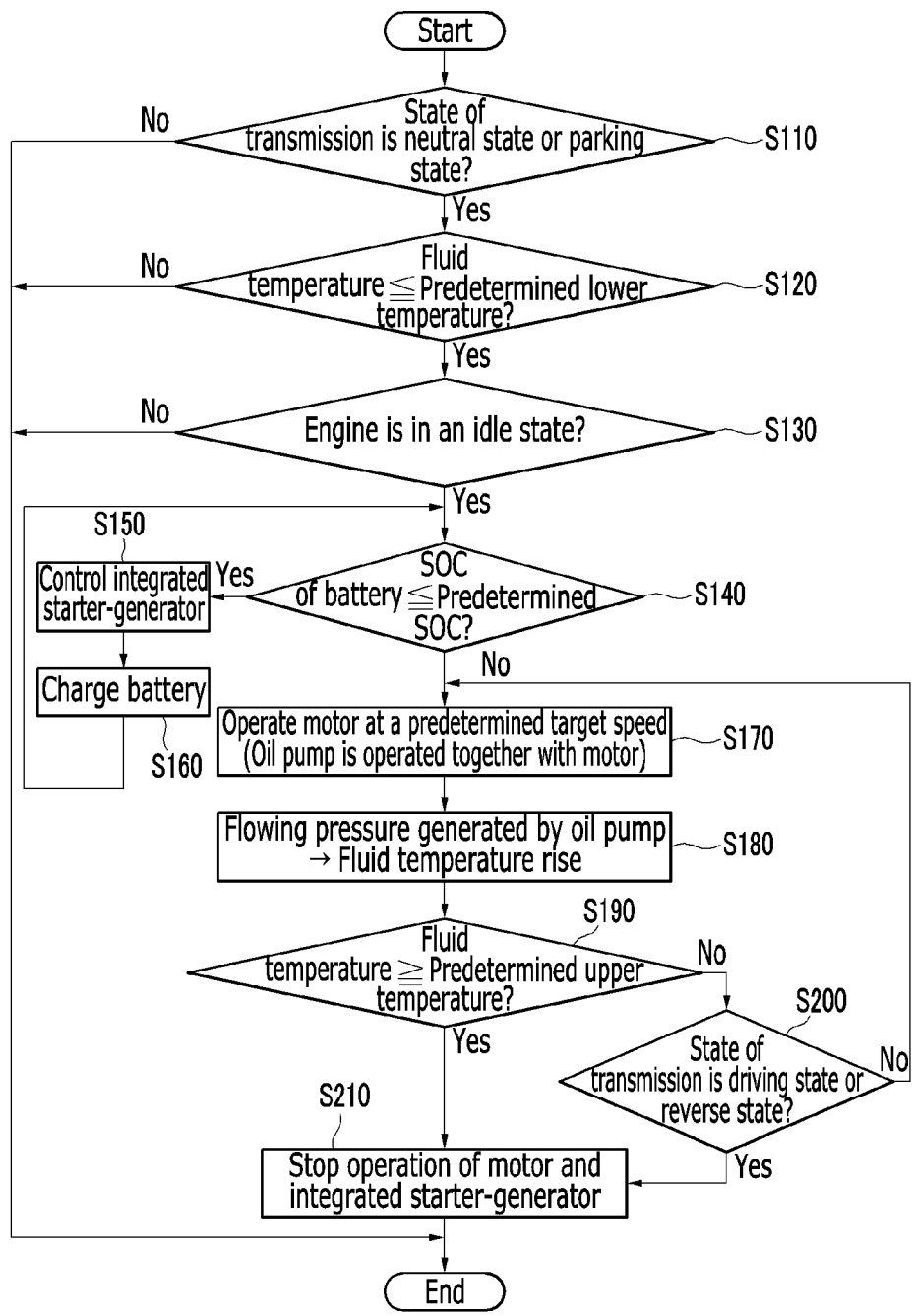
FIG. 4 is an exemplary flowchart illustrating a method of controlling warm-up of clutch fluid in a hybrid electric vehicle according to an exemplary embodiment of the present invention.

The controller 300 may include one or more processors or microprocessors operated by a program including a series of commands for executing processes of the flowchart illustrated in FIG. 4. In the exemplary embodiment of the present invention, the controller 300 may include: the motor control unit (MCU) 120 configured to control the operation of the motor 20; the transmission control unit (TCU) 140 configured to control the operation of the transmission 40; the battery control unit (BCU) 160 configured to manage the battery 60 and to control operation of the battery; and the hybrid control unit (HCU) 200 configured to control the overall operation of the hybrid electric vehicle.

In the method of controlling the warm-up of the clutch fluid according to an exemplary embodiment of the present invention to be described below, partial processes may be executed by the MCU and remaining processes may be executed by any one among the TCU, the BCU, and the HCU. However, the scope of the present invention is not limited to a following exemplary embodiment. The controller may be implemented by being incorporated with the description of an exemplary embodiment of the present invention. Further, the MCU, the TCU, the BCU, and the HCU may perform a different combination of processes than those described in the exemplary embodiment.

Hereinafter, a method of controlling warm-up of clutch fluid in a hybrid electric vehicle according to an exemplary embodiment of the present invention is described in detail with reference to the accompanying drawings.

FIG. 4 is an exemplary flowchart illustrating a method of controlling warm-up of clutch fluid in a hybrid electric vehicle according to an exemplary embodiment of the present invention. As shown in FIG. 4, the controller 300 may be configured to determine whether delivery of power from the engine 10 and motor 20 in the transmission 40 is cut (S110). In other words, the controller 300 may be configured to determine whether the transmission 40 is in a neutral position (N range) or a parked position (P range). For example, the position of the transmission 40 may be identified by an inhibitor switch, which is apparent to a person of ordinary skill in the art.

When the transmission 40 is in the neutral position or the parked position, the controller 300 may be configured to detect temperature of the clutch fluid through the oil temperature sensor 90, and compare the detected temperature with a predetermined lower temperature (S120). The predetermined lower temperature may be a reference temperature at which the warm-up of the clutch fluid is necessary. The predetermined lower temperature may be, for example, −10 degrees Celsius, but it should be understood that the scope of the present invention is not essentially limited thereto.

When the detected temperature of the clutch fluid is equal to or less than the predetermined lower temperature, the controller 300 may be configured to determine whether the engine 10 is in an idle state (S130). The idle state of the engine 10 may be identified by a conventional art which is apparent to a person of ordinary skill in the art, and thus a detailed description thereof is omitted.

Figure 5:
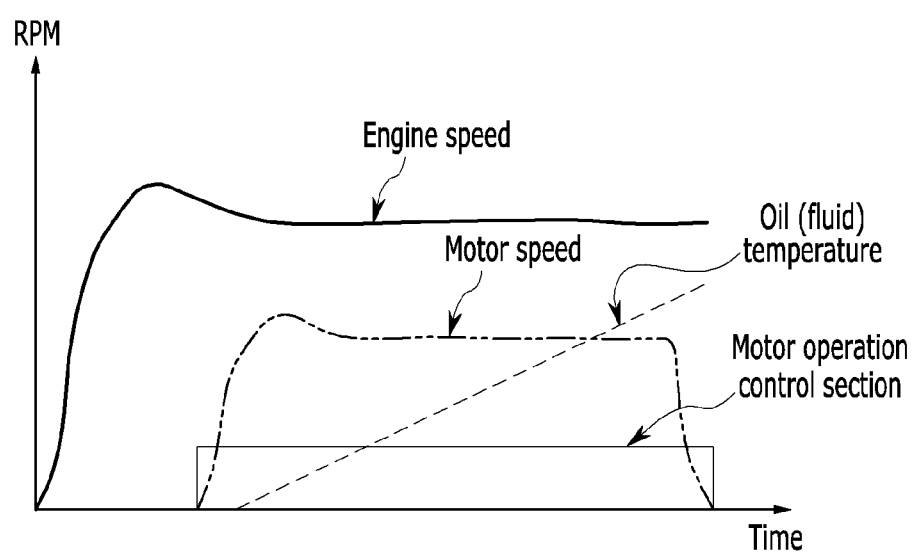
FIG. 5 is an exemplary graph for explaining operation according to an exemplary embodiment of the present invention.

When the detected temperature of the clutch fluid is equal to or less than the predetermined lower temperature, the controller 300 may proceed to step S170 to be described below. However, the controller 300 may identify the idle state of the engine 10 prior to executing the process of step 170. Specifically, when the engine 10 is not in the idle state, that is, the engine 10 is not driven, when the controller 300 operates the motor 20, a driver may hear noises associated with operation of the motor 20. Accordingly, as shown in FIG. 5, the exemplary embodiment of the present invention may prevent the driver from hearing the noises by operating the motor 20 only while the engine 10 is in the idle state to allow the noises to be overshadowed by an engine sound.

When step S130 is processed, the controller 300 may be configured to determine whether a SOC (state of charge) of the battery 60 is equal to or less than a predetermined SOC (S140). The predetermined SOC may be set to as much as the motor 20 needs to be able to be properly driven. For example, the predetermined SOC may be over 80% of a full SOC of the battery 60.

When the SOC of the battery 60 is equal to or less than the predetermined SOC, the controller 300 may be configured to operate the integrated starter-generator 70 and charge the battery 60 with power generated by the integrated starter-generator 70 (S150 and S160). Until the SOC of the battery 60 increases to over 80% of the full SOC of the battery 60, the controller 300 may be configured to operate the integrated starter-generator 70 and charge the battery 60 with power generated by the integrated starter-generator 70.

When the SOC of the battery 60 is greater than the predetermined SOC in step 140, the controller 300 may be configured to operate and maintain the motor 20 at a predetermined target speed (S170). The motor 20 may be operated and controlled at the predetermined target speed to operate the oil pump 80 which is connected with the shaft of the motor 20 and is driven by torque of the motor 20.

When the oil pump 80 is operated, the clutch fluid that operates the clutch 30 may flow in the clutch 30 and in pipes connected to the clutch 30 by pressure generated in the oil pump 80. When the clutch fluid flows in the clutch 30 and in the pipes connected to the clutch 30, the temperature of the clutch fluid may increase by frictional heat due to the flow of the clutch fluid itself (S180).

The predetermined target speed may be a motor speed which is able to generate a pressure greater than a predetermined pressure in the oil pump 80. The pressure generated in the oil pump 80 may force the clutch fluid to flow. For example, the predetermined target speed may be equal to or greater than 500 rpm. When the motor 20 is operated at or over 500 rpm, pressure that is able to force the clutch fluid to flow may be generated in the oil pump 80. For example, the pressure which is able to force the clutch fluid to flow may be 5 bar. When the motor 20 is operated over 500 rpm, a pressure of over 5 bar may be generated in the oil pump 80.

While operating and maintaining the motor 20 at the predetermined target speed, the controller 300 may be configured to detect temperature of the clutch fluid through the oil temperature sensor 90. Then, the controller 300 may be configured to compare the detected temperature with a predetermined upper temperature (S190). The predetermined upper temperature may be a reference temperature at which the warm-up of the clutch fluid is unnecessary. The predetermined upper temperature may be, for example, 0 degrees Celsius, but it should be understood that the scope of the present invention is not essentially limited thereto.

When the detected temperature of the clutch fluid is equal to or greater than (e.g., beyond) the predetermined upper temperature, the controller 300 may be configured to stop operation of the motor 20 (S210). In step S210, when the integrated starter-generator 70 supplies power to the motor 20, the controller 300 may also be configured to stop operation of the integrated starter-generator 70.

Further, when the transmission 40 is shifted to a drive position (D range) or a reverse position (R range), the controller 300 may be configured to stop operation of the motor 20 despite of temperature of the clutch fluid since operation priority of the motor 20 is not to increase temperature of the clutch fluid, but to generate torque for driving.

Hence, the exemplary embodiment of the present invention may rapidly increase temperature of the clutch fluid by only operation of the motor in the state of disconnecting the clutch, without slip control of the clutch.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the accompanying claims.

| Description of Reference Numerals | | |
|---|---|---|
| 10: engine | 20: motor | 30: clutch |
| 40: transmission | 60: battery | 70: integrated starter-generator (ISG) |
| 80: oil pump | 90: oil temperature sensor | 300: controller |

What is claimed is:

1. A method of controlling warm-up of fluid in a vehicle that has a clutch that controls power delivery between an engine and a motor, and an oil pump that is operated by the motor to generate hydraulic oil pressure operating the clutch, the method comprising:
   determining, by a controller, whether delivery of power from the engine and motor in a transmission is cut;
   detecting, by the controller, temperature of the fluid using an oil temperature detector; and
   maintaining, by the controller, the motor at a predetermined target speed to operate the oil pump connected to the motor when the detected temperature of the fluid is equal to or less than a predetermined temperature,
   wherein the predetermined target speed is a motor speed at which sufficient pressure for flowing the fluid is generated in the oil pump operating with the motor,
   wherein the transmission is an automatic transmission, and wherein the determining of whether delivery of power of the engine and motor in a transmission is cut includes determining that that delivery of power from the engine and motor in the transmission is cut when the transmission is in a neutral position (N range) or a parked position (P range).

2. The method of claim 1, wherein the maintaining of the motor at a targeted speed is performed when the engine is in an idle state.

3. The method of claim 1, wherein the operating of the motor includes:
operating, by the controller, an integrated starter-generator and charging a battery with power generated by the integrated starter-generator when a state of charge (SOC) of the battery is equal to or less than a predetermined SOC.

4. The method of claim 3, further comprising:
stopping, by the controller, operation of the motor when the temperature of the fluid increases beyond a predetermined temperature.

5. The method of claim 1, further comprising:
stopping, by the controller, operation of the motor when the transmission is in a drive position (D range) or a reverse position (R range).

6. The method of claim 4, further comprising
stopping, by the controller, operation of the integrated starter-generator when the operation of the motor is stopped.

7. A system that controls warm-up of fluid in a vehicle, the system comprising:
a clutch configured to control power delivery between an engine and a motor;
an oil pump configured to be operated with the motor and to generate flowing pressure operating the clutch;
an oil temperature detector configured to detect temperature of the fluid;
an integrated starter-generator configured to start the engine or to generate electric power by output of the engine; and
a controller configured to:
determine whether delivery of power from the engine and motor in a transmission is cut;
detect temperature of the fluid by an oil temperature detector; and
maintain the motor at a predetermined target speed to operate the oil pump connected to the motor when the detected temperature of the fluid is equal to or less than a predetermined temperature, wherein the predetermined target speed is a motor speed at which sufficient pressure for flowing the fluid is generated in the oil pump operating with the motor.

8. The system of claim 7, wherein the predetermined target speed is a motor speed at which a pressure greater than a predetermined pressure is generated in the oil pump operating with the motor.

9. The system of claim 7, wherein the maintaining of the motor at a targeted speed is performed when the engine is in an idle state.

10. The system of claim 7, wherein
the transmission is an automatic transmission, and
the determining of whether delivery of power from the engine and motor in a transmission is cut includes determining that the delivery of power of the engine and motor in the transmission is cut when the transmission is in a neutral position (N range) or a parked position (P range).

11. The system of claim 7, wherein the controller is further configured to:
operate an integrated starter-generator and charging a battery with power generated by the integrated starter-generator when a state of charge (SOC) of the battery is equal to or less than a predetermined SOC.

12. The system of claim 11, wherein the controller is further configured to:
stop operation of the motor when the temperature of the fluid increases beyond a predetermined temperature.

13. The system of claim 10, wherein the controller is further configured to:
stop operation of the motor when the transmission is in a drive position (D range) or a reverse position (R range).

14. The system of claim 12, wherein the controller is further configured to:
stop operation of the integrated starter-generator when the operation of the motor is stopped.

15. A non-transitory computer readable medium containing program instructions executed by a processor or controller, the computer readable medium comprising:
program instructions that determine whether delivery of power from the engine and motor in a transmission is cut;
program instructions that detect temperature of the fluid by an oil temperature detector;
program instructions that maintain the motor at a predetermined target speed to operate the oil pump connected to the motor when the detected temperature of the fluid is equal to or less than a predetermined temperature, wherein the predetermined target speed is a motor speed at which sufficient pressure for flowing the fluid is generated in the oil pump operating with the motor; and
program instructions that operate an integrated starter-generator and charging a battery with power generated by the integrated starter-generator when a state of charge (SOC) of the battery is equal to or less than a predetermined SOC.

16. The non-transitory computer readable medium of claim 15, wherein the program instructions maintain the motor at a targeted speed when the engine is in an idle state.

17. The non-transitory computer readable medium of claim 15, further comprising:
program instructions that stop operation of the motor when the temperature of the fluid increases beyond a predetermined temperature.

\* \* \* \* \*